United States Patent [19]
Huissoon et al.

[11] Patent Number: 5,465,037
[45] Date of Patent: Nov. 7, 1995

[54] SYSTEM AND METHOD FOR TRACKING A FEATURE ON AN OBJECT USING A REDUNDANT AXIS

[76] Inventors: Jan P. Huissoon, 468 Lorindale Street, Waterloo, Ontario, Canada, N2K 2P6; David L. Strauss, 200 Eastforest Trail, Kitchener, Ontario, Canada, N2N 3E8

[21] Appl. No.: 182,126
[22] PCT Filed: Jan. 11, 1994
[86] PCT No.: PCT/CA94/00039
§ 371 Date: Jan. 13, 1994
§ 102(e) Date: Jan. 13, 1994
[87] PCT Pub. No.: WO94/15758
PCT Pub. Date: Jul. 21, 1994

[30] Foreign Application Priority Data
Jan. 11, 1993 [GB] United Kingdom .................. 9300403

[51] Int. Cl.$^6$ ..................................... B25J 9/16
[52] U.S. Cl. .................. 318/568.11; 318/574; 318/577; 219/124.34; 901/42
[58] Field of Search ..................... 318/560–646; 364/474.2–474.32; 395/80–99; 901/3, 5, 7, 9, 15, 17, 42, 46, 47; 219/125.1, 124.34

[56] References Cited

U.S. PATENT DOCUMENTS

| | | | |
|---|---|---|---|
| 4,531,192 | 7/1985 | Cook | 901/10 X |
| 4,568,816 | 2/1986 | Casler, Jr. | 901/5 X |
| 4,590,356 | 5/1986 | Povlick et al. | 901/9 X |
| 4,613,743 | 9/1986 | Nied et al. | 901/42 X |
| 4,621,333 | 11/1986 | Watanabe | 318/574 X |
| 4,675,502 | 6/1987 | Haefner et al. | 219/124.34 |
| 4,724,301 | 2/1988 | Shibata et al. | 219/124.34 |
| 4,734,572 | 3/1988 | Gorman | 318/577 X |
| 4,812,614 | 3/1989 | Wang et al. | 219/124.34 |
| 4,831,232 | 5/1989 | Andersson et al. | 219/124.34 |
| 4,831,316 | 5/1989 | Ishiguro et al. | 318/568.13 |
| 4,952,772 | 8/1990 | Zana | 318/577 X |
| 5,006,999 | 4/1991 | Kuno et al. | 219/124.34 |
| 5,132,887 | 7/1992 | Torii et al. | 901/42 X |
| 5,274,213 | 12/1993 | Sartorio | 219/125.1 |

Primary Examiner—Paul Ip
Attorney, Agent, or Firm—Daryl W. Schnurr

[57] ABSTRACT

A system and method for seam tracking in real time without path preprogramming uses at least two degrees of freedom and at least one degree of freedom created by a redundant axis. A robot can be used to weld or apply adhesive or sealant to a workpiece that is mounted on a positioner that it is movable relative to a base of the robot as a movable end of the robot tracks a seam on the workpiece. A sensor expresses a seam trajectory in workpiece coordinates and queues the coordinates in a computer processor so that the coordinates can be extracted from the processor to cause the movable end of the robot to track the seam. The workpiece can remain stationary and the robot base can be moved or the base can remain stationary and the workpiece can be moved or both the workpiece and the robot base can be moved. Any reasonable number of redundant axes can be utilized so long as there is one control parameter independently defined for each degree of freedom greater than six. Previous seam tracking systems do not have more than one degree of freedom with one of the degrees of freedom being created by redundant axes and previous systems do not automatically move the robot base relative to the workpiece.

17 Claims, 11 Drawing Sheets

Prior art

PRIOR ART

Prior art

SYSTEM AND METHOD FOR TRACKING A FEATURE ON AN OBJECT USING A REDUNDANT AXIS

BACKGROUND OF THE INVENTION

Field of the Invention

This invention relates to a system and method for tracking a feature on an object in real time without path preprogramming and, more particularly, to a seam tracking system incorporating one or more kinematically redundant axes, where the system is used for welding or sealant or adhesive application.

Description of the Prior Art

Robotic seam tracking is known and the seam or feature to be tracked or followed is identified using a sensor attached to an end or tool of the robot. The sensor monitors the surface of the workpiece in which the seam or feature is located, slightly ahead of the tool. The end of the robot is moved along the seam or feature while maintaining a desired orientation of the tool with respect to the surface. Previous arc welding systems are often programmed on-line, point by point, along the seam to be welded. This can be a very time consuming procedure and inaccurate positioning or jigging of the workpiece or poor joint preparation can result in the production of unacceptable welds. The accuracy of the previous systems can be improved by improving the dimensional accuracy of the components to be welded and improving the consistency with which these components can be jigged or, alternatively, by attempting to compensate for part-to-part variation in both dimensions and fixturing with the use of on-line sensing of the location and preparation of the seam. In low volume manufacturing or in applications where weld quality is of the utmost importance, the use of seam sensing is the more viable approach since this enables the controllable welding parameters to be adjusted in response to sensed joint dimensions and location.

In previous robotic arc-welding systems, a seam tracking sensor is located ahead of the welding torch to determine the location of the seam to be welded. This usually requires a nominal torch trajectory to be pre-programmed, based on the shape of the surface being tracked. The sensor can also used to measure joint dimensions so that torch travel speed and offset may be adjusted to compensate for variations in fit up and joint preparation. This requires that the seam be mapped in such a way that these parameters can be changed over the time delay between obtaining the data and welding the seam at that location.

When tracking a feature or seam on a stationary workpiece, the location of any point on the seam, as sensed by the seam tracker, may be expressed in absolute coordinates (i.e. in a coordinate frame that is fixed with respect to the robot base). This is possible since the position of the end-point is known in absolute coordinates (through the forward kinematics of the robot), the location of the seam tracker coordinate frame is known with respect to the end-point, and the seam feature location is defined in the seam tracker coordinate frame. Since the workpiece is stationary, it would be equally valid to express the sensed seam location in a coordinate frame attached to the workpiece, this workpiece frame being related to the absolute coordinate frame by a fixed transformation, which is denoted as T.

Further, it is known to use a system for real-time seam tracking for a welding robot without preprogramming as described in a thesis presented at the University of Waterloo, Waterloo, Ontario, Canada by D. L. Strauss in 1991 entitled "Real-Time Seam Tracking and Torch Control For a Welding Robot".

Previous seam tracking systems can suffer from disadvantages in that they require path preprogramming, which can be very time consuming and expensive. If the workpiece is not required to move relative to a robot base, this can be reasonably accommodated with the current practice. If the workpiece is required to continuously move relative to the robot base, a workpiece positioner is used; to provide control of the relative end-point to surface velocity, a large number of accurately sequenced locations must be preprogrammed for both the positioner and the robot corresponding to the coordinated motion required.

SUMMARY OF THE INVENTION

It is an object of the present invention to provide a system of seam tracking whereby the robot tracks a seam while providing real-time control of the relative position and orientation of the end-point of the robot with respect to the seam being tracked. The robot is able to track a seam on the surface of the workpiece without any description of the workpiece surface being required. The workpiece surface is moved during the seam tracking and the robot is able to dynamically track a seam on the surface of an unknown workpiece while accommodating workpiece surface orientation criteria.

With the present invention, no path preprogramming is required and the present system can be used to automatically provide fully coordinated motion of kinematically redundant axes that result from the movement of the workpiece.

A system for tracking a feature on an object in real time without path preprogramming uses a manipulator having a movable end and a base. The movable end is movable relative to said base. A sensor is mounted adjacent to said movable end, said sensor being oriented to monitor said feature near said end. The system has at least two degrees of freedom with at least one degree of freedom being created by a redundant axis. There are control means for receiving information from said sensor, for processing said information to control said redundant axis and for sending processed information to said manipulator, thereby causing said end to track said feature in real time without path preprogramming.

A method for tracking a feature on an object in real time without preprogramming uses a system having a manipulator with a movable end and a base. There are means for moving said manipulator base relative to said object. A sensor is mounted adjacent to said end, said sensor being oriented to monitor said feature near said end. The system has at least two degrees of freedom with at least one degree of freedom being created by a redundant axis. There are control means for said system, said method comprising activating said control means to receive information from said sensor, processing said information to control said redundant axis, sending processed information to said manipulator and causing said end to track said feature.

DESCRIPTION OF A PREFERRED EMBODIMENT

Figure 1:
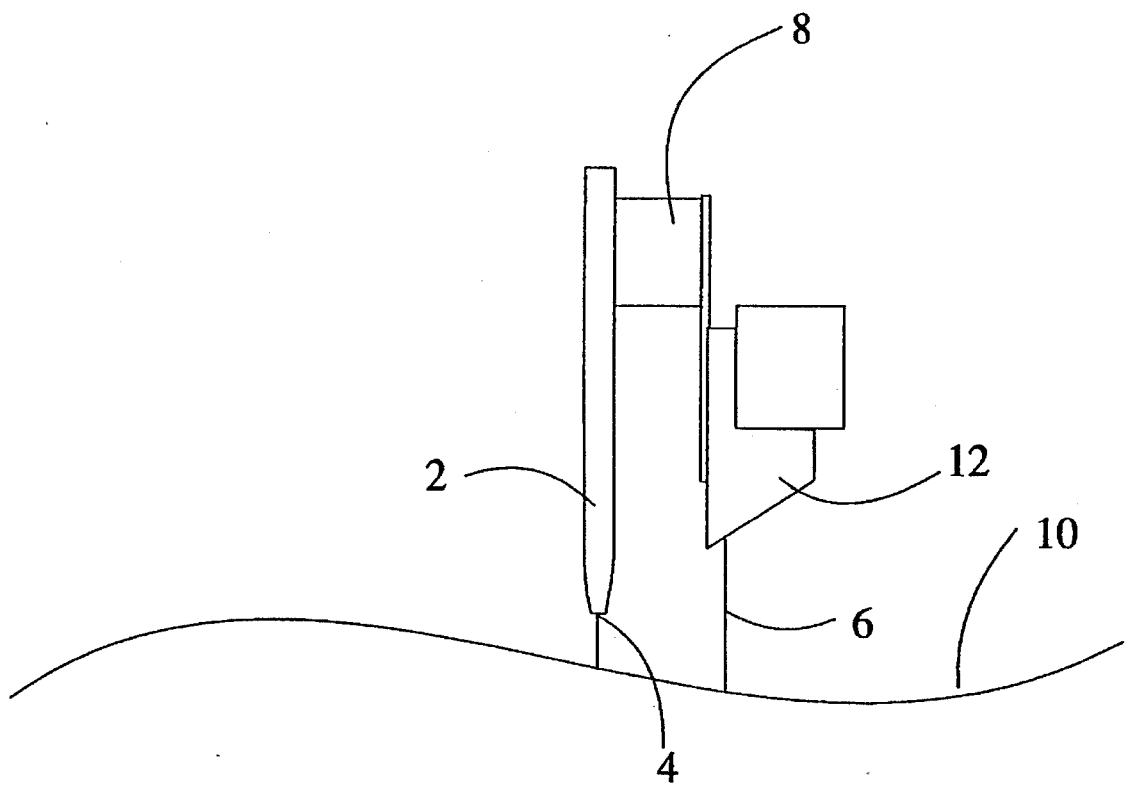
FIG. 1 is a schematic side view of a prior art torch and sensor in a tracking position on a seam.

In FIG. 1, there is shown a schematic side view of a prior art welding torch 2 having a movable end 4 with a sensor 12 mounted adjacent to said end 4 on the end of the arm 8 of a robot (not shown). It can be seen that the torch 4 and sensor 12 are tracking a seam 10.

The sensor used to carry out this invention consists of a CCD array camera (512×512 pixels) and a structured laser light source. The laser beam 6 is spread through a cylindrical lens to project a line onto the surface of the workpiece. The camera, which is mounted in the same housing as the laser, views the workpiece surface from an angle of about 20 degrees to the plane of the projected laser light. A narrow band optical filter placed in front of the camera lens filters out all wavelengths except that of the laser. The resultant image provides an oblique view of the workpiece surface profile on which the seam is located.

A hardware preprocessor board acts as the interface between the seam tracking camera and a PC-AT used for data analysis. Each video field is compressed into an array of 240 values corresponding to the 240 scan lines in the field. Each array value represents the pixel location that best estimates the centre of the laser line on the corresponding scan line in the image. To provide noise rejection to the effects of spatter and arc fumes in detecting the laser line, successive pixel intensities are matched to a tunable intensity profile using a finite impulse response (FIR) filter. The intensity profile of each scan line of the image is compared to a predefined intensity profile of the laser stripe at every pixel located along the scan line. The position where the two profiles match best is returned as the location of the laser line. The sensor data thus represents sensor-to-surface distance measurements along a segment of the intersection curve between the workpiece surface and a normal plane.

The preprocessed image data represent a piecewise description of the surface profile of the workpiece. The objective in the analysis of this data is to extract the location of the seam within the image. Features on the surface of the workpiece (such as the seam to be tracked) appear as variations in the continuity of the data. The magnitude of these variations reflects the severity of the changes in the surface gradient. It has been found that the majority of commonly encountered seam geometries may be well categorized using the first and second derivatives of the preprocessed image data. For example, a V-groove may be detected by searching for a zero cross on the first derivative and a non-zero value of the second derivative; the array index at which these two criteria are met corresponds to the location of the seam.

To obtain the derivative at any point in the set of array values, a window of n points is set up symmetrically about the point at which the derivative is required. The slope of the straight line that best fits the points within the window is calculated, and used as an approximation to the derivative at the centre of the window. The derivative at each point in the array (except the first and last n/2 points) may be calculated by moving the window step-by-step along the array values. The second derivative is calculated in a similar fashion using the first derivative as its data. The window size used for the first and second derivatives is thirty-two and eight data points respectively. The use of recursive equations makes the algorithm for calculating the derivatives extremely efficient.

A further criterion may be included to reduce errors due to spurious data; since the seam is assumed to be continuous, the location of the seam should be close to recent previous locations. Should the estimated seam location not be within a specified window about the last few seam locations, the data is likely corrupted and should therefore be discarded and replaced by an estimate based on the most recent reliable data.

The location of the seam must be transformed from pixel coordinates to actual spatial dimensions. These can then be converted to tool frame coordinates since the origin of the camera frame is fixed with respect to the tool frame of the robot.

The sensor 12 must always be positioned so that the seam 10 is kept within the field of view of the camera. The orientation of the torch will thus vary with the curvature of the workpiece on which the seam 10 is located. In general, the closer the camera is placed to the torch, the less influence the workpiece topography has on the control of the torch orientation. However, as the separation between the camera and the torch is reduced, more arc light, spatter and fumes are encountered in the area of the camera, thus reducing the reliability with which the laser light 6 (and hence the seam) can be detected. Therefore, the torch to camera distance is a trade-off between data integrity and orientation control.

The torch-to-camera distance must also be taken into account when planning the torch trajectory around corners or curves in the seam. If the robot controller simply attempts to maintain the sensed seam location in the centre of the field of view of the camera and direct the motion of the movable end 4 to the sensed seam location, the torch trajectory will not follow the seam accurately unless the seam is straight. A control strategy is required that maintains the seam within the field of view of the camera and also guides the torch along the seam already sensed.

Figure 2:
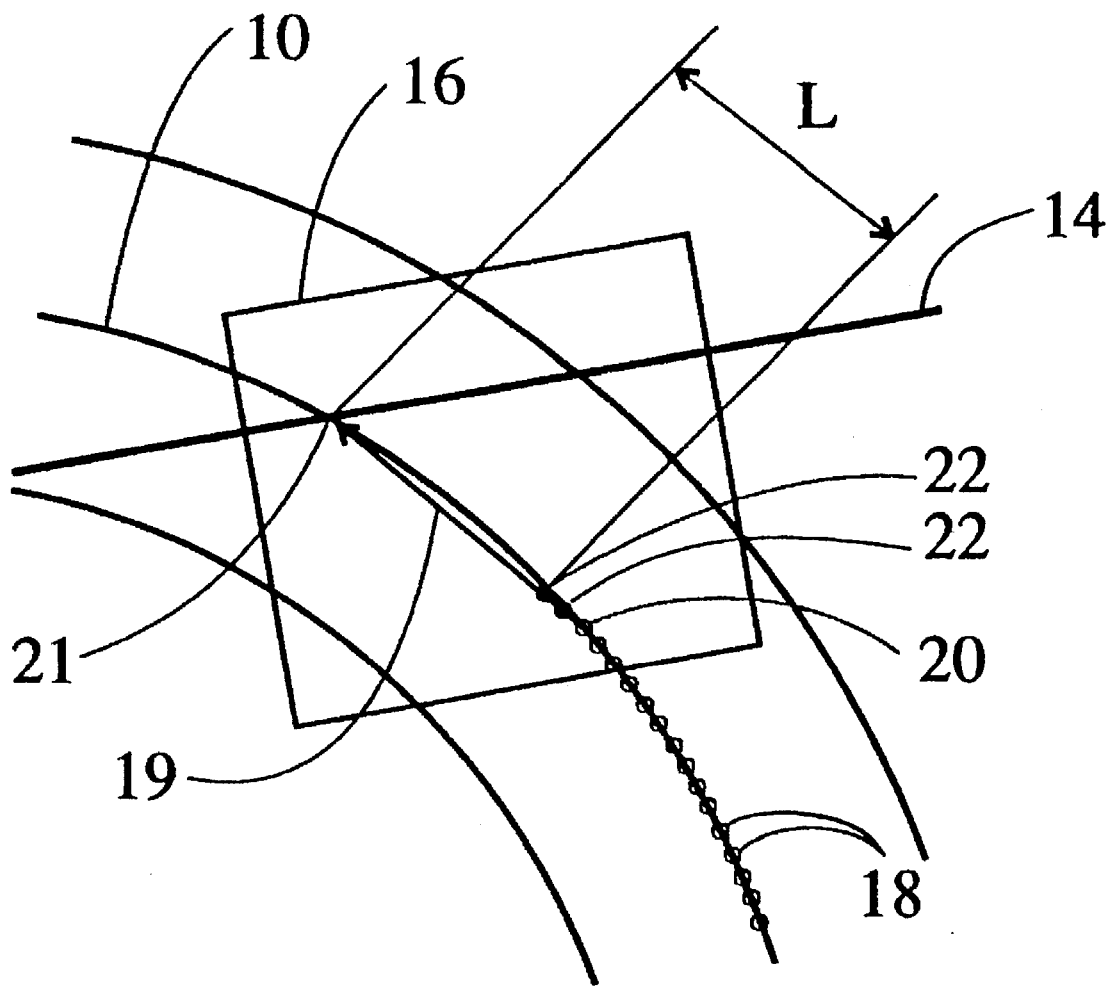
FIG. 2 is a schematic top view of a prior art seam tracking system.

In FIG. 2, there is shown a prior art view of a laser line 14 intersecting a seam 10. The camera (not shown) has a field of view 16. A series of set-points 18 along the seam 10 are points that have previously been generated as the seam tracker (not shown) moves along the seam. The last set-point generated along the seam is shown at point 20. The camera detects a point 21 at which the laser line 14 intersects the seam 10. A straight line 19 connecting point 20 to point 21 is calculated. The incremental displacement is found by subtracting a fixed length 1 from the distance between point 20 and point 21. The incremental displacement is divided by the set-point distance to give the number of new set-points 22 to be placed along line 19. The number of new set-points 22 that are generated on analyzing each image field depends on the distance the camera has moved, which in turn is dependent on the velocity of the torch and the geometry of the workpiece. This effectively acts as a lowpass filter on the rate of change of direction of the sequence of set-points 18, since small lateral variations in the sensed seam location do not significantly change the direction of the line 19 as successive set-points are generated. Since the set-points are generated at the field rate of the camera (60 Hz), little error is introduced by this approximation.

The path that the end-point of the robot is to follow is defined by the sequence of set-points identified by the seam tracker as it precedes the tool. This sequence of set-points is stored as a queue that defines the seam between the current end-point position of the robot and the current sensed location of the seam. On each evaluation of the seam tracking sensor data, the number of new set-points 22 that have been generated are added to the front of the queue.

Figure 3:
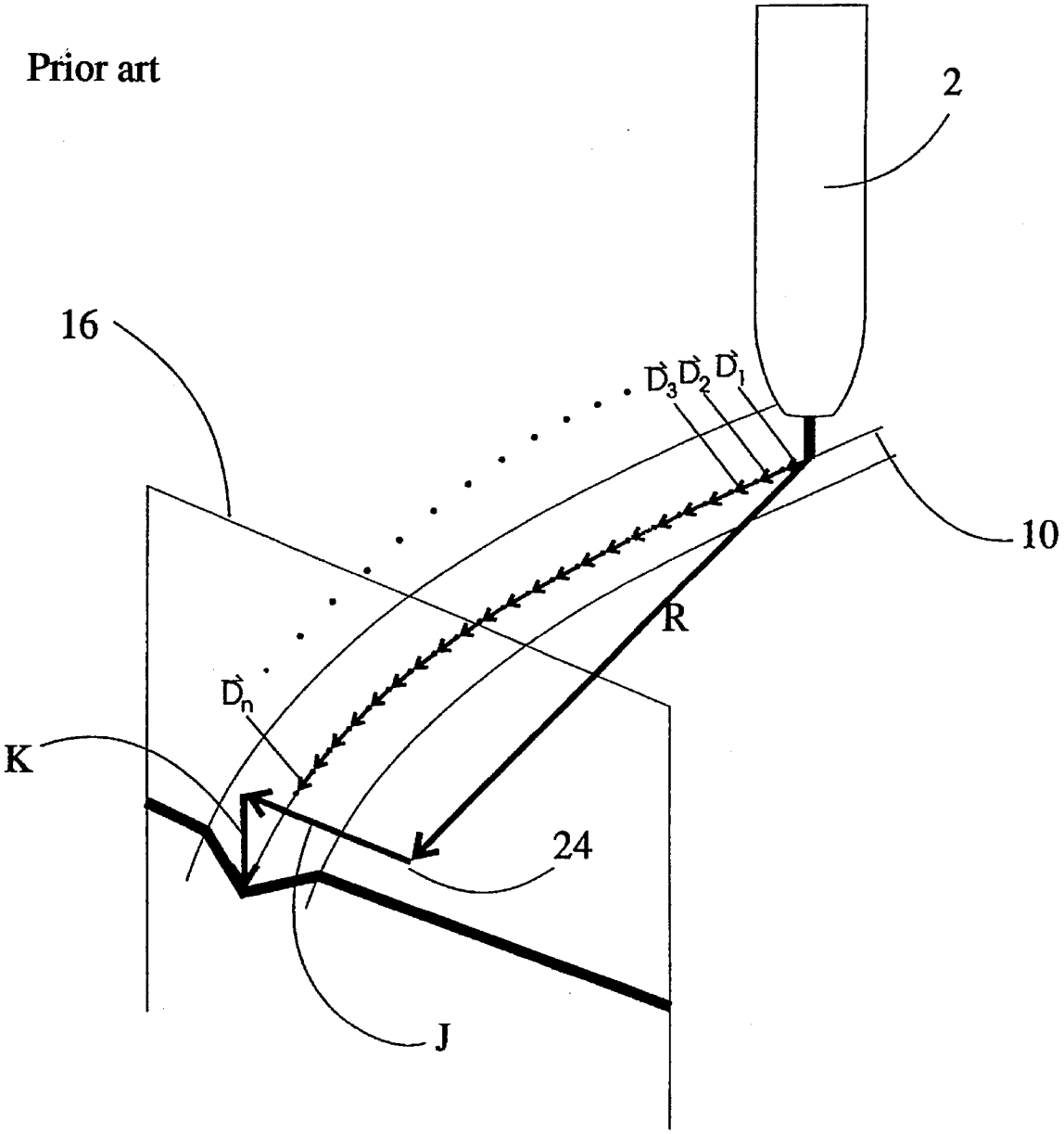
FIG. 3 is a schematic perspective view of a prior art tracking system wherein a torch tracks a seam.

As shown in the prior art view shown in FIG. 3, the field of view 16 of the camera (not shown) has a centre 24. The centre 24 is offset from the seam 10 by distances J and K. The torch 2 trails the camera, the distance between the torch and the camera being constant, and is designated by R. The sequence of set-points is shown as $D_1$, $D_2$, $D_3$ ... $D_n$. The spacing between consecutive set-points is D mm, and this is referred to as the unit vector length. These set-points are placed in a queue, the length of which corresponds to the length of seam between the seam-tracking sensor and the torch 2. The spacing between the set-points determines the length of the queue and the accuracy with which the seam is mapped. As the spacing between the setpoints decreases, the number of setpoints required to represent the path from the torch to the camera increases. As the spacing increases, the accuracy with which a curve can be tracked is reduced.

The end-point of the robot travels only a fraction of the distance separating the end-point and the seam tracking sensor (camera) in each incremental end-point motion. The next incremental motion of the robot end-point is planned by removing a number of unit vectors from the back of the queue, and executing this motion in the next trajectory planner cycle of the robot controller. The trajectory planner cycle rate of the robot controller is constant, and is typically 25 Hz. The end-point velocity along the seam is controlled by the number of unit vectors that are removed from the queue in each trajectory planner cycle. The number of unit vectors that define the trajectory that the end-point is to travel may be fractional; if, for example, the end-point is required to move 3.6 unit vectors in the next trajectory planner cycle, the remaining 0.4 unit vector is retained at the back end of the queue.

Having calculated the position along the seam to which the end-point is to move in the next trajectory planner cycle, the required torch stand-off, off-set and orientation with respect to the seam are added in as a transformation relative to the seam location. An important feature of this approach is that it enables the seam tracking program to provide real-time control of the velocity and pose of the torch along the seam.

Since the seam tracking sensor only provides the seam coordinates and workpiece surface angle with respect to the current end-point position, the set-point queue only provides four of the six parameters necessary to control the end point location of the robot. The remaining two parameters are used to ensure that the seam being tracked is kept within the field of view of the seam tracking camera.

Figure 4:
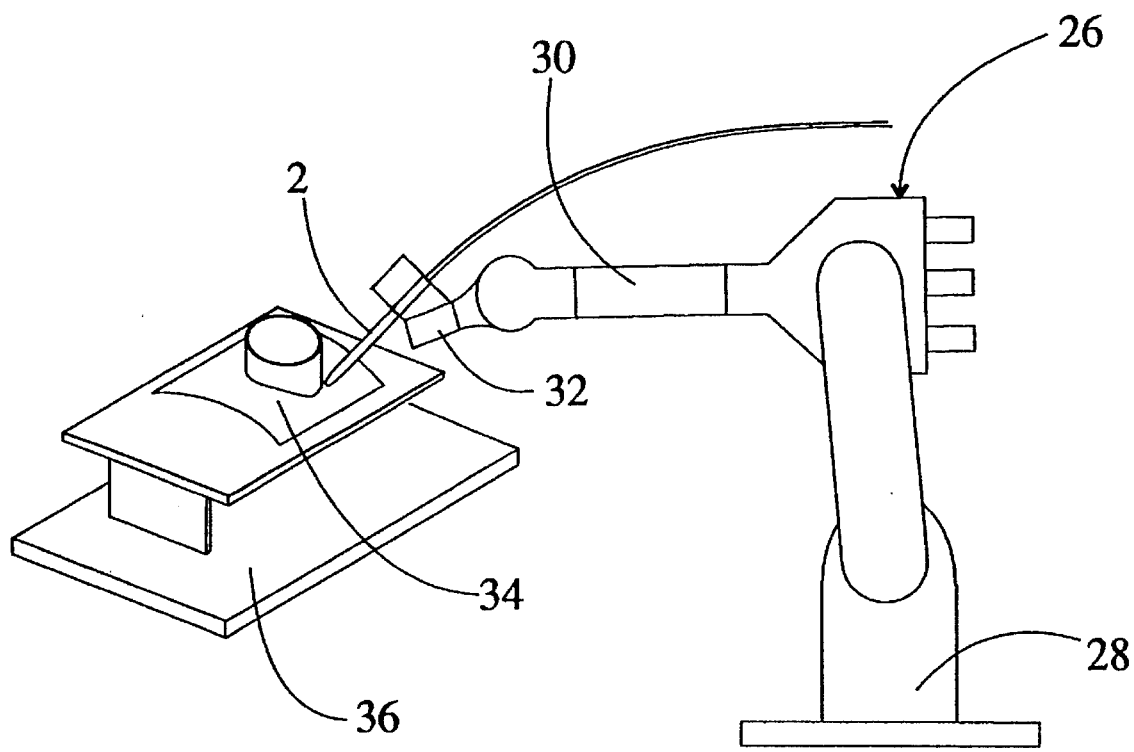
FIG. 4 is a partial perspective view of a prior art system with a torch mounted on a robot adjacent to a stationary workpiece.

In FIG. 4, there is shown a prior art view of a robot 26 having a base 28 and arm 30 and a movable end 32. Attached to the movable end 32 is a welding torch 2. A workpiece 34 is held in a fixed position on a frame 36. The seam tracker is not shown in FIG. 4 but would be affixed to the movable end 32 in such a manner that it is spaced apart from the torch 2 by a fixed distance. There are six degrees of freedom available for seam tracking and torch control. Three degrees of freedom are required to describe the spatial location of the torch tip (X, Y, Z), a further two for defining the orientation of the torch (tilt and lean), and a sixth (rotation) for positioning the seam tracking camera around the torch. This also allows all six parameters required to describe a point in space to be defined, and corresponds to the number of axes on most industrial robots.

Figure 5:
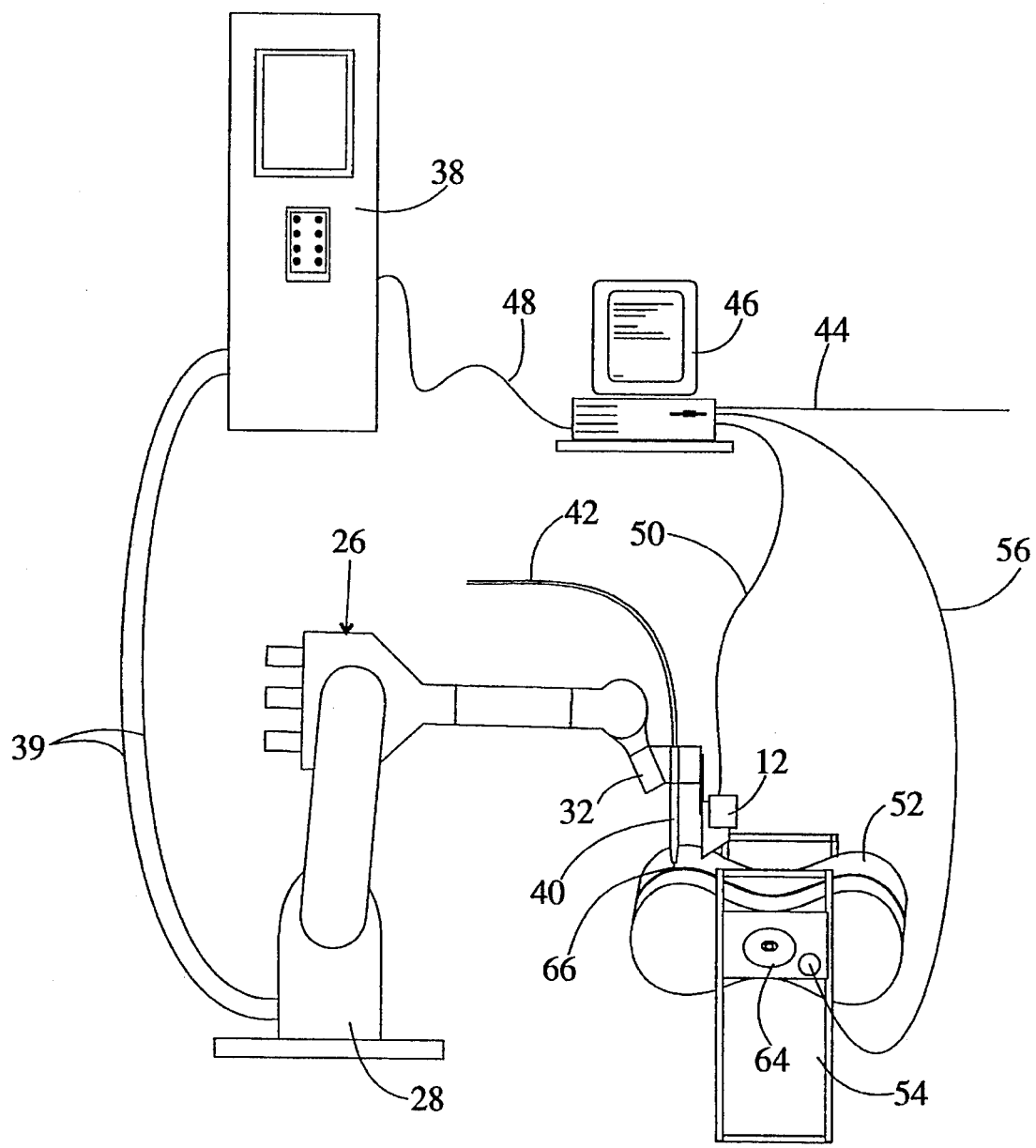
FIG. 5 is a partial schematic view of a system for tracking a feature on an object in accordance with the present invention.

In FIG. 5, there is shown a system for tracking a feature on an object in accordance with the present invention. The system has a robot 26 which has a base 28 and a movable end 32. The robot is connected to a robot controller 38 through lines 39. The movable end 32 supports a head 40 and a seam tracking sensor 12 in a fixed relationship to one another. The head 40 can be a welding torch, a cutting torch, a sealant dispenser, a spray gun, an adhesive dispenser, a laser delivery head or virtually any other tool or dispenser that is desired to be manipulated relative to an object. Of course, cutting torches can be of the oxy-fuel type and plasma type. The seam tracking sensor may be of the structured light type, whereby a topological feature on the workpiece may be sensed, or of the passive type whereby a visible line or mark applied to the workpiece may be sensed. The system can also include a process monitoring sensor to provide data regarding the quality of the weld, adhesive or sealant application provided by the head, and may be structured light optical, passive optical, sonar, or any other appropriate sensing technique. The head 40 is connected to a supply unit (not shown) through connected line 42. For example, when the head is a welding torch, the torch would be connected to a welding power supply. A process control computer (not shown) sets the power supply parameters to control the welding process, based on the measured seam dimensions and on feedback from the process monitoring sensor. An electrical line 44 connects the process control computer (not shown) to a seam tracking computer 46. An electrical line 48 connects the seam tracking computer 46 to the robot controller 38. An electrical line 50 extends between the seam tracking computer 46 and the seam tracking sensor 12. An object or workpiece 52 is held in a frame 54. The frame 54 is a single axis positioner that allows the workpiece to rotate about a single axis. An electrical line 56 extends between the positioner 54 and the seam tracking computer 46. The positioner 54 is powered by a servo motor 64 under the control of software by the seam tracking computer 46. An encoder (not shown) mounted on the positioner axis measures the actual workpiece rotation. The positioner axis is horizontal and passes through the workpiece in the vicinity of its centroid. This gives the robot access to the entire circumference of the workpiece. The positioner or frame 54 is shown as having one axis of rotation, but positioners could be used with more than one axis of rotation. For example, the positioner could have three or more axes of rotation.

The robot used in FIG. 5 is a six degree of freedom articulated arm (Reis V15). A PC-AT computer 46 runs the seam tracking software and communicates directly with the robot controller 38 via a parallel interface bus 48. The single axis positioner 54 is controlled directly by the seam tracking computer 46 via a commercially available motion control interface card (not shown). This seven axis system therefore has one kinematically redundant axis.

Figure 6:
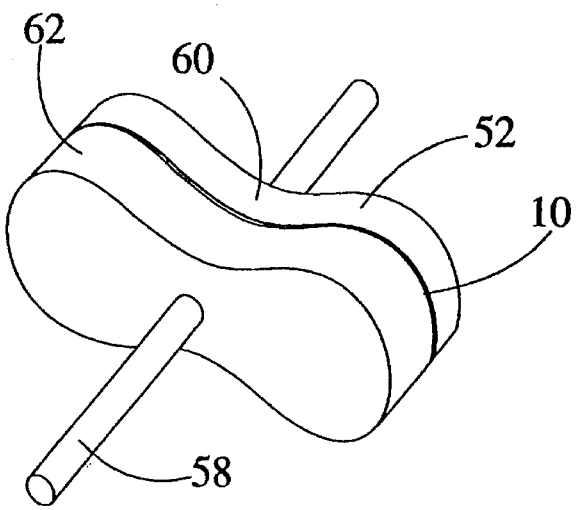
FIG. 6 is a perspective view of the object shown in FIG. 5.

The workpiece 52 can best be seen from FIG. 6. It can be seen that the workpiece has a seam 10, an axis of rotation 58, a concave region 60 and a convex region 62. This shape was chosen to demonstrate the power of the technique of the present invention, since the direction of rotation of workpiece 52 must reverse as the torch passes through the saddle region 60. This coordinated motion would be difficult to achieve by lead-through programming.

The present invention can be used to maintain a constant surface orientation beneath the end-point 66, while maintaining a set (real-time commandable) relative velocity between the end-point and the seam. The coordinate frame that the seam tracking uses is defined with respect to the workpiece, and therefore rotates with the positioner. The advantage that is approach provides is that no special calculations of the relative velocity between the workpiece and the torch are required. The end-point 66 is simply moving relative to the workpiece at the commanded travel speed. The motion of the workpiece is automatically taken into consideration because of the moving coordinate system. The resulting motion of the robot reflects both the motion of the workpiece and the motion due to tracking. Since the workpiece moves, it can be said that the workpiece moves relative to the base 28 of the robot.

The robot controller 38 has been retrofitted with two VME-bus Motorola 68020 processor boards that replace the original control processor board. This enables the robot to run under RCCL (Robot Control "C" Library). RCCL is a library of modules that are compiled and linked directly to the user code. This provides access to all of the internal robot variables, and also enables real-time control of an end point 66 position of the head 40 to be implemented. While the robot is executing a motion, the goal position of that motion can be modified by the seam tracking computer 46. These changes are automatically tracked so that the head position can be continually adjusted by modifying the goal location. Many standard industrial robot controllers cannot be used with the present application due to the inability of the software to accommodate the form of control required by the present invention, or due to the controller architecture itself. The arrangement described in FIG. 5 is a preferred embodiment for a single axis positioner but numerous other arrangements can be made to carry out the invention described within the scope of the attached claims. The invention is not limited to the equipment specified and various equipment will be suitable to carry out the invention.

Figure 7:
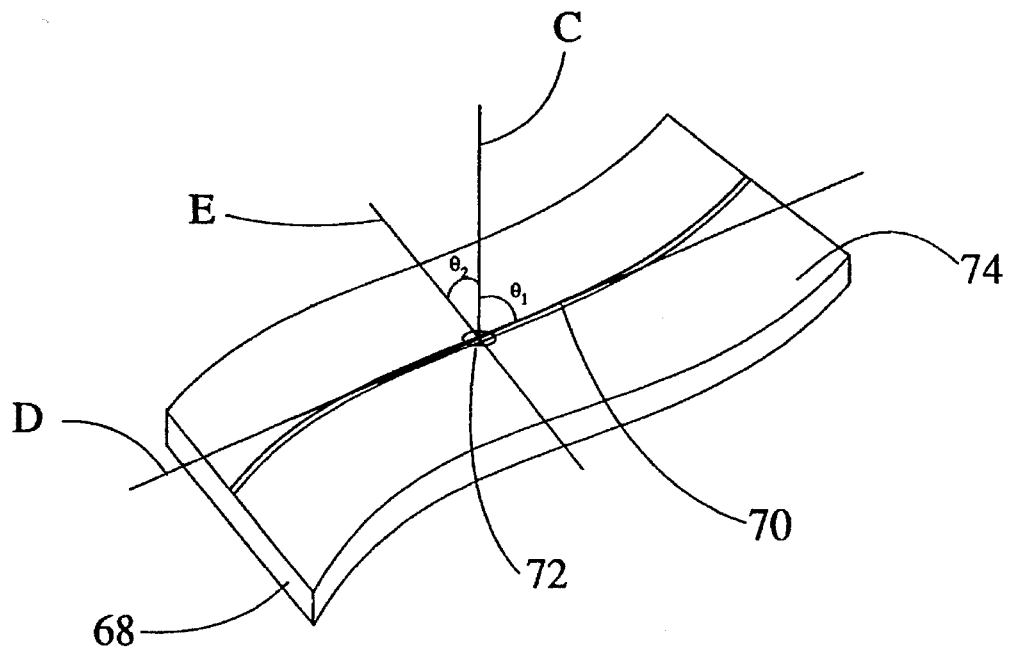
FIG. 7 is a perspective view of another workpiece.

In FIG. 7, there is shown a workpiece 68 having a feature 70 and a weld pool 72 located on an upper surface 74 thereof. The workpiece is supported on a two axis positioner (not shown). An imaginary vertical line C extends through the centre of the weld pool at an angle $\theta_1$ relative to a tangent D in a first plane and at an angle $\theta_2$ relative to a tangent E in a second plane. The tangents D, E are orthogonal to one another. The movement of the workpiece 68 is controlled so that an upper surface 74 in an area of the weld pool 72 is always substantially horizontal by using the angles $\theta_1$ and $\theta_2$ to define the required motion Of the workpiece positioner axes (not shown) to produce this movement. There may be other uses wherein it is desirable to maintain an area of the workpiece in a non-horizontal position.

When the workpiece is moved during the seam tracking process, at least one additional degree of freedom is introduced into the system. It may be desirable or necessary to move the workpiece in situations where the component being tracked is larger than the work envelope of the robot. Further, movement of the workpiece could result in a smaller, less expensive robot being used. Also, in applications such as the production of rolling stock, movement of the workpiece (or robot base) may be the only feasible way of accessing the entire workpiece. The arc welding process is highly dependent on the orientation of the weld pool. Providing control over the orientation of the workpiece greatly simplifies control of the process. Using a single redundant axis (giving a total of seven degrees of freedom) allows one orientation angle to be set. For a cylindrical or axially symmetric component, this would suffice to control the desired weld orientation. For more complex parts, however, more degrees of freedom would be required.

Figure 8:
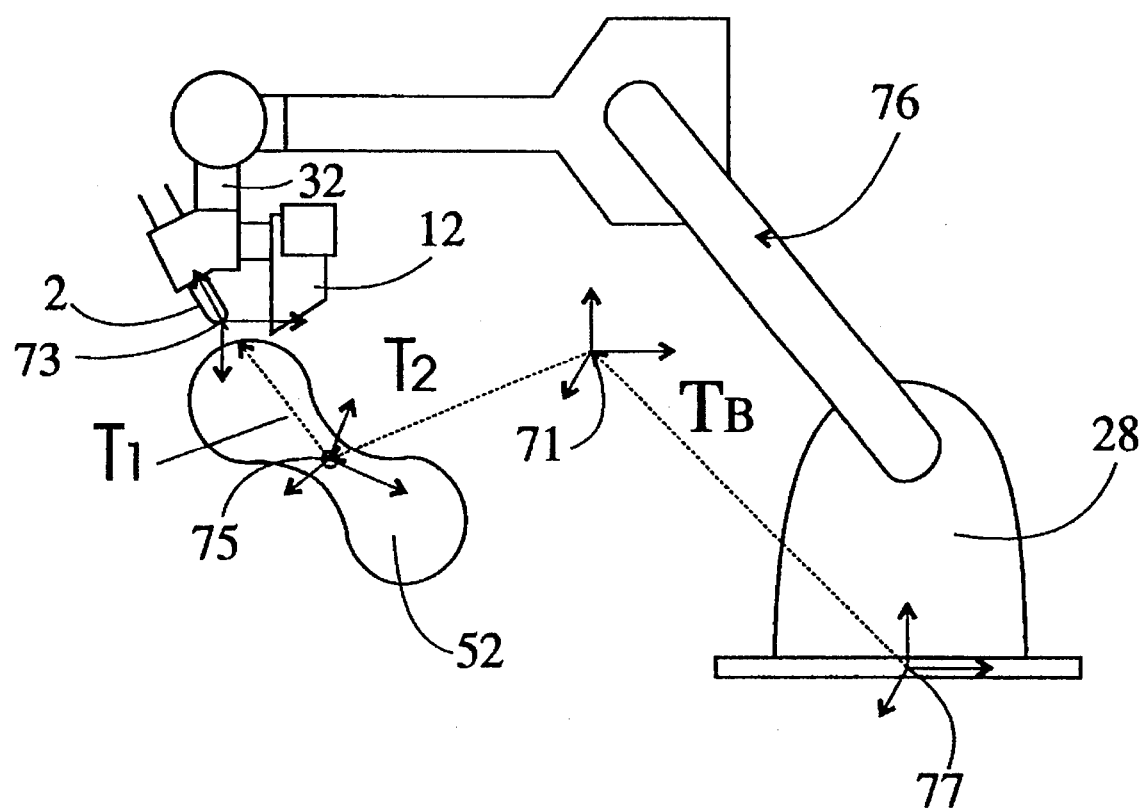
FIG. 8 is a schematic side view of a system in accordance with the present invention using a single axis positioner.

In FIG. 8, a robot 76 has a torch 2 mounted at a movable end 32 adjacent to a seam tracking sensor 12. The robot has a base 28, and a defined base coordinate frame 77. The base coordinate frame 77 is defined in the absolute reference frame 71 by the transformation $T_B$. The workpiece 52 is mounted in a single axis positioner (not shown in FIG. 8). The workpiece coordinate frame 75 is fixed to and rotates with the workpiece 52. The block diagram shown in FIG. 9 describes the manner in which the system for tracking shown in FIG. 8 operates.

Figure 9:
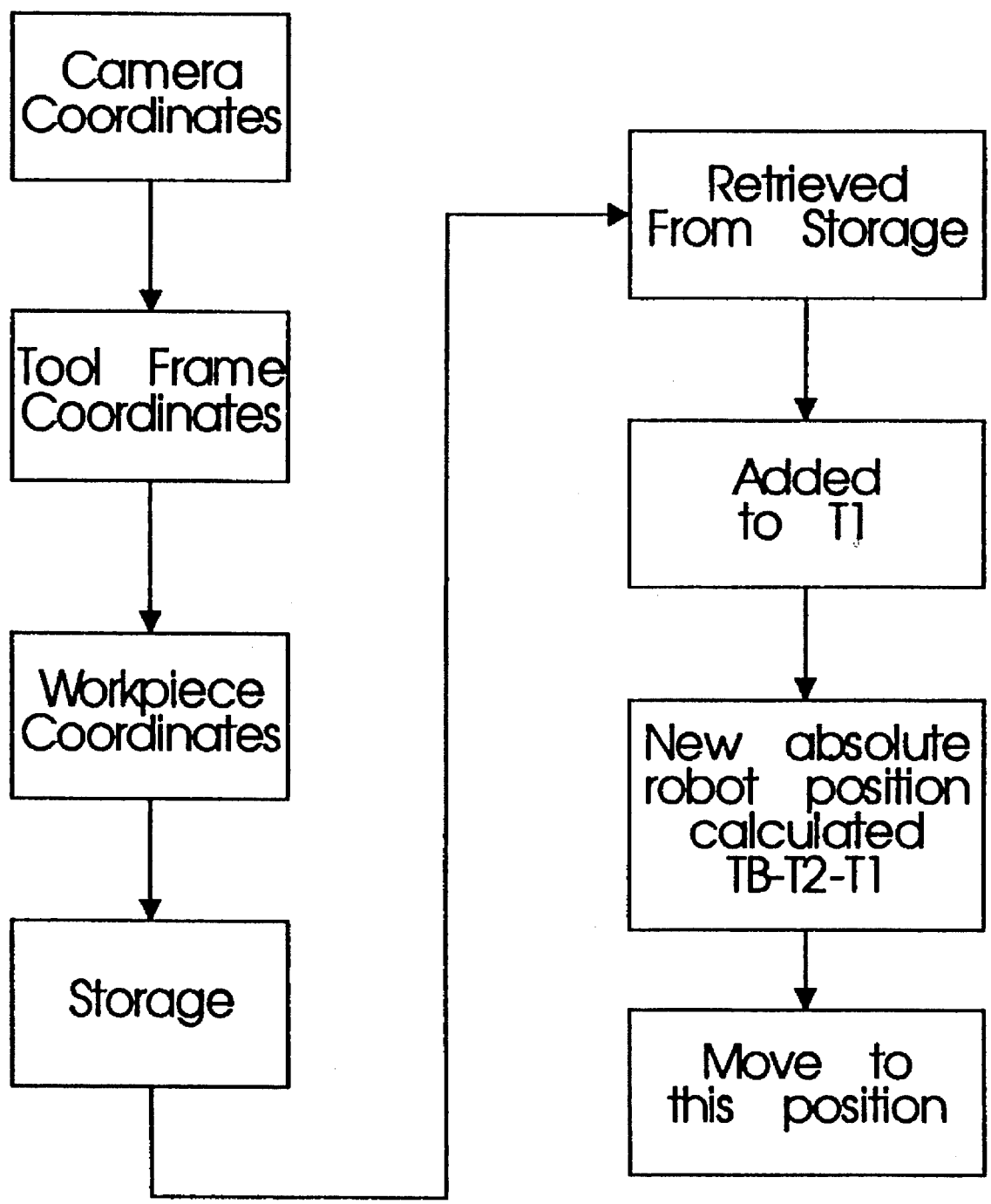
FIG. 9 is a block diagram setting out various steps required to use the system shown in FIG. 8.

If the workpiece is moved while seam tracking, this effectively means that the transformation, T, that relates the workpiece frame 75 to the absolute reference frame 71, is no longer constant. This is accommodated by storing the incremental unit vectors that define the seam path in the workpiece coordinate frame 75. The sequence of transformation operations are shown in FIG. 9. The transformation $T_1$ defines the current end-point position in the frame 75 attached to, and rotating with, the workpiece 52. Transformation $T_2$ defines the current position of the workpiece frame 75 with respect to the absolute reference frame 71. The seam location is identified in the camera (seam tracking sensor) coordinates as a couplet (x and y locations of the seam feature in the camera frame). This is converted into tool-frame 73 coordinates by the transformation relating the camera and the end-point (or torch). The critical step is to now convert this into workpiece coordinates using the transformation that defines the relationship between the current workpiece positioner axis/axes angles and the current tool-frame (end-point position). The incremental vectors are stored (queued) with respect to the workpiece surface, in the workpiece coordinate frame 75. If the workpiece is rotated, the queue of vectors is still valid, since it is defined with respect to the workpiece frame 75. By transforming these vectors by the inverse transformations of $T_2$ and $T_B$, the vector queue can once again be expressed in base frame coordinates, and can therefore be tracked by the robot. This is shown in the latter four blocks in FIG. 9. The net effect is as if the robot were unaware that the workpiece is moving and is simply following the prescribed incremental displacements generated by the seam tracker. This is the key aspect of this mode of end-point control.

The primary benefit of including kinematically redundant axes in a robotic seam tracking system is that criteria other than simply tracking the seam may be incorporated. The question as to how such kinematically redundant axes may be properly controlled, based only on the data provided by the seam tracking sensor, together with prescribed workpiece surface orientation and end-point position criteria, and without any prescribed description of the workpiece, is central to the technique. The solution is to derive the required workpiece motion from the orientation (or position) of the end-point of the robot while it is tracking the seam. This is most easily described using an example: consider the workpiece to be a cylinder on which a circumferential weld is to be made, with the requirement that the weld pool is maintained in the horizontal position and that the welding torch is normal to the workpiece surface. The workpiece positioner axis passes through the axis of symmetry of the cylinder. The robot controller is "unaware" that the workpiece is capable of being rotated about its axis. On starting to track the circumferential seam with the welding torch vertical above a top point of the workpiece, the seam tracker determines that the torch should be moved forward relative to the workpiece. This motion is started as planned, but the condition that the weld should be placed on a horizontal surface (i.e. that the torch should be vertical) is now no longer valid. This error is obtained by projecting the tool vector (the torch axis) onto the vertical plane to which the workpiece positioning axis is normal. The torch misalignment (as defined by this error) is used by the system that controls the rotation of the cylinder causing the cylinder to rotate so that the error is reduced, i.e. the point of welding is driven back towards the current top point on the cylinder. The incremental displacements generated by the seam tracker are therefore reduced by the surface displacement of the (moving) workpiece. The net effect is that the torch will remain close to vertical for the entire circumferential weld, and the torch will remain positioned over the top of the cylinder. The robot controller, responding to the displacement queue provided by the seam tracker, is not even aware that the workpiece is rotating; it is simply following the incremental vectors in the queue. The redundant axis controller is simply responding to the error in torch orientation caused by the robot tracking the seam; it is entirely unaware (and not concerned with) the other parameters that describe the spatial location of the torch.

Figure 10:
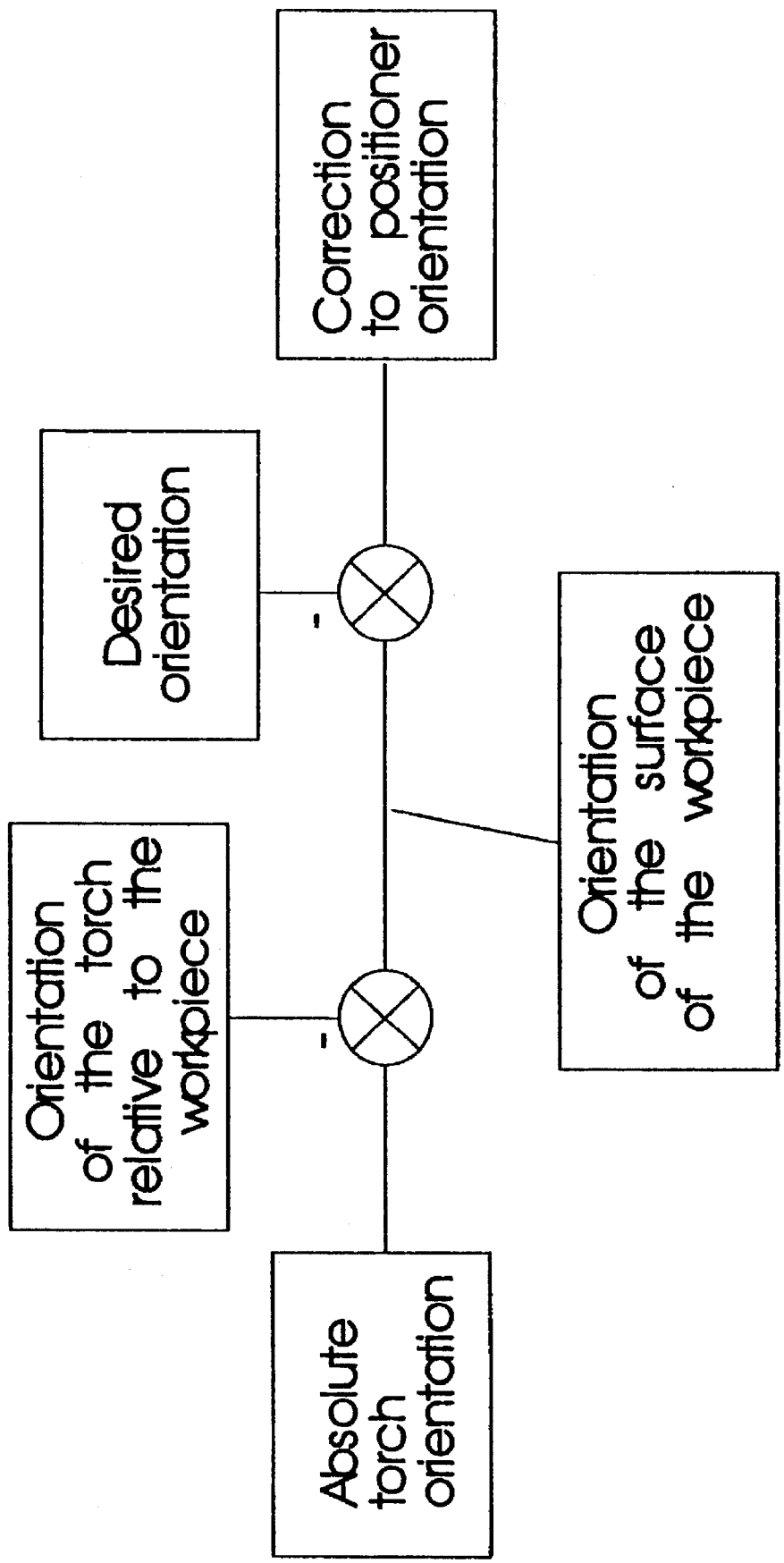
FIG. 10 is a schematic view showing orientation of a torch relative to a workpiece as the workpiece moves.

The sequence of steps for correction of the torch as described are set out in FIG. 10. It should be noted that while tracking the moving workpiece, the standoff, offset, tilt and orientation of the torch with respect to the seam may still be dynamically specified; i.e. the spatial relationship between the torch and seam may be continually varied if desired, while the seam on the moving workpiece is being tracked. It is also important to note that in the above example, the curvature of the workpiece need not be known before the welding procedure is begun. If the cylindrical workpiece were replaced with one with an elliptical cross-section, the seam tracking and redundant axis control would be performed with equal ease (although the torch would now move vertically in response to the motion of the workpiece). This is an important aspect of the technique since it means that the workpiece surface profile need not be predefined before commencing the welding procedure. This is where an enormous advantage is gained over conventional robot programming techniques.

Figure 11:
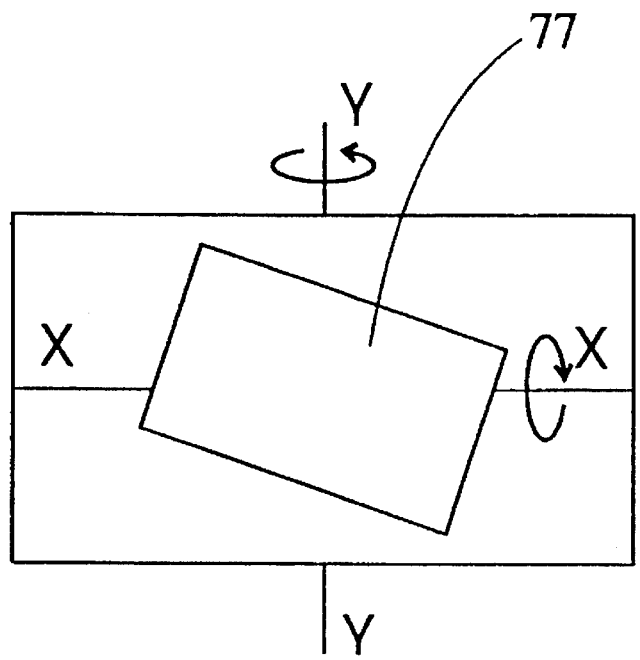
FIG. 11 is a schematic side view of a cylindrical object mounted on a movable frame.
Figure 12:
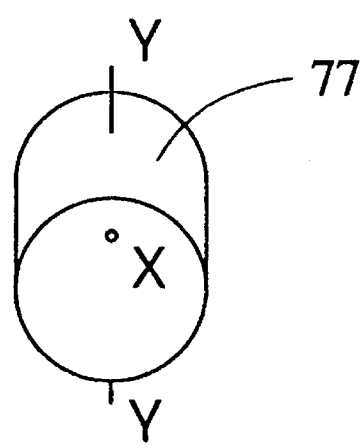
FIG. 12 is a front view of said object of FIG. 11 with said frame deleted.
Figure 13:
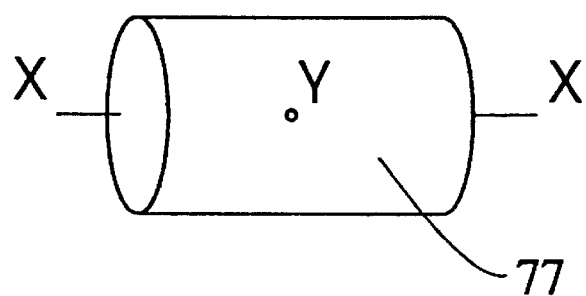
FIG. 13 is an end view of said object of FIG. 11 with said frame deleted.

Now consider the necessary motion of the axes for a cylindrical workpiece 77 and axis arrangement shown in FIGS. 11, 12 and 13. A circumferential weld is to be placed around the cylinder and the prescribed constraint is once again that the weld must be made in the flat position. It should be fairly apparent that the workpiece will have to rotate about the axis X—X, and that the X—X axis will have to be positioned about the Y—Y axis. Note that, as before, the shape of the workpiece is not known ahead of time; it could equally well be an elliptical cross-section. Assuming that a suitable starting position is established (i.e. one where the torch is positioned over the seam with the surface of the workpiece below the torch being horizontal), the same approach as used before can be used to derive the required workpiece axes rotations. Assume that the seam tracking is initiated and the end-point moves forward as in the previous example. Now since there are two workpiece axes to be controlled, two "error" criteria need to be defined. These may be obtained by projecting the tool vector onto two planes: the first is the plane to which the Y—Y axis is normal, and the second is the plane containing the Y—Y axis. Using standard inverse Euler kinematics, the required rotations about the X—X and Y—Y axes to reduce these errors to zero are obtained.

If the cylinder in FIGS. 11, 12 and 13 is replaced by an "egg"-shaped workpiece, a third axis normally will be required for the workpiece positioner to enable the surface under the torch to be maintained at an arbitrary desired angle. The error angles to control the positioner axes are obtained as before by projecting the torch vector onto the planes containing and normal to the positioner axes.

The above examples describe what can be referred to as a "lag" control approach. The "lead" approach may also be used by first calculating the errors that would result if the move were to be made, and then controlling the workpiece axes so that this error will not occur. Translational workpiece axes may also be incorporated in the control scheme as described above. However, these axes obviously will not affect the workpiece surface orientation, only its position in absolute coordinates. Nonetheless, the general concept of driving any workpiece axes for orientation and/or position control may be addressed with the technique described.

It should also be noted that this technique of dynamic tracking on a moving workpiece surface includes applications where the motion of the surface is not derived from the torch orientation or position. Should the workpiece motion be controlled by an operator (or indeed even be preprogrammed), this technique enables a seam on the workpiece to be dynamically tracked.

While the benefits of redundancy are evident, the addition of redundant axes creates significant problems in conventional lead-through programming. Each point on the seam to be welded must first be positioned in the desired orientation, and the robot then taught the corresponding position over the seam. Unfortunately, this only guarantees a match at the taught positions; while moving between these, the relative torch-workpiece location may vary significantly unless successive points are close together, both along the seam and in absolute space. Furthermore, on-line control or torch velocity becomes extremely difficult, since the velocity is measured relative to the workpiece rather than being absolute. Unless the distance between the taught positions along the seam are equally spaced at very close intervals, relative travel speed over the seam cannot be controlled accurately.

To avoid these problems, control of the workpiece positioner must be integrated with the robot and seam tracking system. For every degree of freedom above the six required to define the location and orientation at any point in space, a control parameter must be defined. The control parameters muse be defined independently from those describing the position of the robot end-point, if control of the workpiece orientation is to be achieved. Control parameters may be defined in many ways. For example, the control parameter for a seventh degree of freedom could be defined as the absolute slope of the workpiece surface below the welding torch. If the torch is required to maintain a constant angle with respect to the seam, this criterion can be reformulated to maintain a constant torch angle in space. This may be calculated by projecting the approach vector of the robot tool frame onto the vertical plane. The difference between this angle and the desired torch angle then provides the command signal to control the seventh axis.

Figure 14:
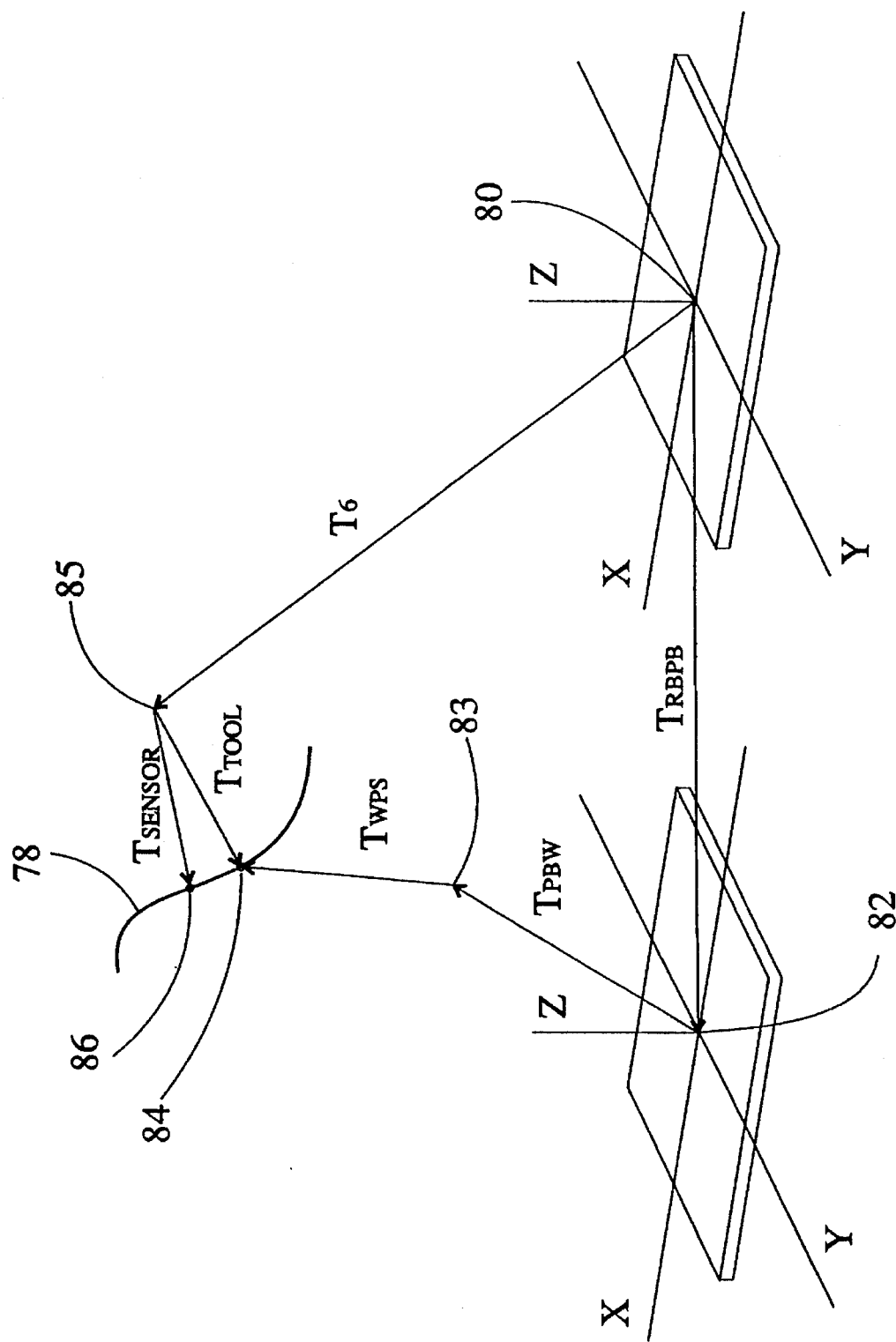
FIG. 14 is a schematic view of a system for tracking a feature using at least a two axis workpiece positioner.

In FIG. 14, there is shown a schematic representation of the relationships between the transformations in redundant axis control of a system for tracking a feature with a two axis positioner or up to a six axis positioner. When the positioner is a six axis positioner, a second robot can be used as the positioner. The seam tracking robot has a base frame 80. Transformation $T_6$ defines a wrist centre 85 (position and orientation) of the robot end. Transformation $T_{SENSOR}$ defines the location of the seam 78 in the seam tracking sensor field of view, with respect to the wrist centre 85. Transformation $T_{TOOL}$ defines the end-point of the tool 84 with respect to the wrist centre 85. Thus, the sensed seam location 86 in the seam tracking sensor coordinate frame (not shown) may be expressed in the seam tracking robot base frame 80 as $T_6 \cdot T_{SENSOR}$. Transformation $T_{RBPB}$ defines the relationship between the seam tracking robot base frame 80 and a workpiece positioner base frame 82. $T_{PBW}$ defines the transformation from the positioner base frame 82 to the workpiece coordinate frame 83. Transformation $T_{WPS}$ defines the seam location at the tool point 84 in the workpiece coordinate frame 83. $T_{PBW}$ depends on the number of redundant axes the positioner possesses. $T_{PBW}$ may represent the $T_6$ transformation of a six axis workpiece positioning robot or it may represent a standard two axis workpiece positioner or a three, four or five axis workpiece positioner. To control the positioner (where it is a two axis positioner), criteria must be set that will give two parameters that will be used to control the two axes. The criteria are chosen to give some benefit to the overall system. The number of axes that may be defined by $T_{PBW}$ is only restricted by the availability of sufficient criteria.

The present invention can also be used in various fields other than welding. Further, the system can be used where the workpiece is stationary and the robot base moves. For example, if the system was used to seal a crack in a roadway, the workpiece would be stationary. The system can also be used where both the workpiece and the robot base move. Various modifications, within the scope of the attached claims, will be readily apparent to those skilled in the art.

What we claim as our invention is:

1. A system for tracking a feature on an object in real time without path preprogramming, said system comprising:
   (a) a manipulator having a movable end and a base, said movable end being movable relative to said base;
   (b) a sensor mounted adjacent to said movable end, said sensor being oriented to monitor said feature near said end;
   (c) said system having at least two degrees of freedom with at least one degree of freedom being created by a redundant axis; and
   (d) said system having control means for receiving information from said sensor, for processing said information to control said redundant axis and for sending processed information to said manipulator, thereby causing said end to track said feature in real time without path preprogramming.

2. A system as claimed in claim 1 wherein there are means for moving said base relative to said object.

3. A system as claimed in claim 2 wherein said adjustment means is a movable frame supporting said object.

4. A system as claimed in claim 3 wherein said frame can rotate said object relative to said base.

5. A system as claimed in claim 4 wherein said frame can rotate said object in more than one plane.

6. A system as claimed in claim 5 wherein the system has at least six degrees of freedom.

7. A system as claimed in claim 6 wherein the sensor is a camera.

8. A system as claimed in claim 7 wherein the manipulator is a robot.

9. A system as claimed in claim 8 wherein there are seven degrees of freedom and said end has a tip, three degrees of freedom for said tip of said movable end, two degrees of freedom for the orientation of the movable end, one degree of freedom for positioning the sensor around said movable end and one degree of freedom for said adjustment means moving said base relative to said object.

10. A system as claimed in claim 9 wherein the control means is at least one computer processor that controls a position of the object relative to said base as well as said manipulator and said movable end.

11. A system as claimed in claim 10 wherein there is a control parameter independently defined for each degree of freedom greater than six.

12. A system as claimed in claim 11 wherein the movable end supports at least one head selected from the group of a welding torch, cutting torch, a sealant dispenser, spray gun, adhesive dispenser and a laser delivery head, said frame positioning said object so that a surface thereof is always substantially horizontal in an area of said head.

13. A system as claimed in any one of claims 1, 2 or 3 wherein the number of degrees of freedom created by redundant axes ranges from two to six and there is one control parameter independently defined for each degree of freedom greater than six.

14. A system as claimed in claim 11 wherein the object is stationary and said base of said robot moves relative to said object.

15. A method for tracking a feature on an object in real time without path preprogramming using a system having a manipulator with a movable end and a base, means for moving said manipulator base relative to said object, a sensor mounted adjacent to said end, said sensor being oriented to monitor said feature near said end, said system having at least two degrees of freedom with at least one degree of freedom being created by a redundant axis, with control means for said system, said method comprising activating said control means to receive information from said sensor, processing said information to control said redundant axis, sending processed information to said manipulator and causing said end to track said feature in real time without path preprogramming.

16. A method as claimed in claim 15 including the step of moving said object to maintain said object in a substantially horizontal position in an area of said end as said end follows said feature on said object.

17. A method as claimed in claim 15 including the steps of expressing a sensed feature trajectory in object coordinates, suitably queuing these coordinates in said control means, extracting said coordinates from said control means and causing said end to follow said feature.

* * * * *